US011520629B2

(12) United States Patent
Rossi et al.

(10) Patent No.: US 11,520,629 B2
(45) Date of Patent: Dec. 6, 2022

(54) DYNAMIC TASK ALLOCATION FOR NEURAL NETWORKS (71) Applicant: Apple Inc., Cupertino, CA (US)

(72) Inventors: Francesco Rossi, Sunnyvale, CA (US); Gaurav Kapoor, Santa Clara, CA (US); Michael R. Siracusa, Mountain View, CA (US); William B. March, San Jose, CA (US)

(73) Assignee: Apple Inc., Cupertino, CA (US)

( * ) Notice: Subject to any disclaimer, the term of this patent is extended or adjusted under 35 U.S.C. 154(b) by 366 days.

(21) Appl. No.: 16/776,338

(22) Filed: Jan. 29, 2020

(65) Prior Publication Data
US 2020/0167193 A1 May 28, 2020

Related U.S. Application Data (63) Continuation of application No. 15/721,716, filed on Sep. 29, 2017, now Pat. No. 10,585,703.
(Continued)

(51) Int. Cl.
G06F 9/46 (2006.01)
G06F 9/50 (2006.01)
(Continued)

(52) U.S. Cl.
CPC .......... G06F 9/50 (2013.01); G06F 8/451 (2013.01); G06F 9/485 (2013.01); G06F 9/5038 (2013.01);
(Continued)

(58) Field of Classification Search
None
See application file for complete search history.

(56) References Cited

U.S. PATENT DOCUMENTS 8,276,164 B2  9/2012 Munshi
8,719,839 B2  5/2014 Yan et al.
(Continued)

FOREIGN PATENT DOCUMENTS

WO  WO 2016/078008  5/2016

OTHER PUBLICATIONS

Chun et al; CloneCloud: Elastic Execution between Mobile Device and Cloud; EuroSys'11, Apr. 10-13, 2011 (Year: 2011).*
(Continued)

Primary Examiner — Bing Zhao
(74) Attorney, Agent, or Firm — Bakerhostetler (57) ABSTRACT The subject technology provides for dynamic task allocation for neural network models. The subject technology determines an operation performed at a node of a neural network model. The subject technology assigns an annotation to indicate whether the operation is better performed on a CPU or a GPU based at least in part on hardware capabilities of a target platform. The subject technology determines whether the neural network model includes a second layer. The subject technology, in response to determining that the neural network model includes a second layer, for each node of the second layer of the neural network model, determines a second operation performed at the node. Further the subject technology assigns a second annotation to indicate whether the second operation is better performed on the CPU or the GPU based at least in part on the hardware capabilities of the target platform.

20 Claims, 8 Drawing Sheets

Related U.S. Application Data (60) Provisional application No. 62/514,779, filed on Jun. 3, 2017.

(51) Int. Cl.
*G06N 3/063* (2006.01)
*G06F 8/41* (2018.01)
*G06F 9/48* (2006.01)
*G06N 3/02* (2006.01)

(52) U.S. Cl.
CPC ............ *G06F 9/5044* (2013.01); *G06N 3/02* (2013.01); *G06N 3/063* (2013.01); *G06F 2209/509* (2013.01)

(56) References Cited

U.S. PATENT DOCUMENTS

| | | | |
|---|---|---|---|
| 9,443,192 B1 | 9/2016 | Cosic | |
| 2007/0294512 A1 | 12/2007 | Crutchfield et al. | |
| 2010/0223213 A1 | 9/2010 | Su | |
| 2011/0157195 A1 | 6/2011 | Sprangle et al. | |
| 2012/0297163 A1* | 11/2012 | Breternitz | G06F 9/5066 |
| | | | 712/E9.034 |
| 2014/0333638 A1 | 11/2014 | Kaminski et al. | |
| 2015/0116334 A1 | 4/2015 | Nagai | |
| 2017/0024829 A1 | 1/2017 | Mittal et al. | |
| 2017/0024849 A1 | 1/2017 | Liu | |
| 2017/0078376 A1 | 3/2017 | Coward et al. | |
| 2017/0255496 A1 | 9/2017 | Deng et al. | |

OTHER PUBLICATIONS

Chinese Office Action from Chinese Application No. 201880035228.0, dated Apr. 19, 2021, 4 pages, including English language summary.

Chinese Office Action from Chinese Application No. 201880035228.0, dated Jan. 21, 2021, 12 pages, including English language summary.

Chinese Office Action from Chinese Application No. 201880035228.0, dated Aug. 6, 2020, 11 pages, including English language summary.

International Search Report and Written Opinion from PCT/US2018/029201, dated Jul. 24, 2018, 12 pages.

European Office Action from European Patent Application No. 18723333.3, dated Jul. 13, 2021, 11 pages.

\* cited by examiner

DYNAMIC TASK ALLOCATION FOR NEURAL NETWORKS

CROSS-REFERENCE TO RELATED APPLICATIONS

The present application is a continuation of U.S. patent application Ser. No. 15/721,716 entitled "DYNAMIC TASK ALLOCATION FOR NEURAL NETWORKS," filed Sep. 29, 2017, which claims the benefit of U.S. Provisional Patent Application Ser. No. 62/514,779, entitled "DYNAMIC TASK ALLOCATION FOR NEURAL NETWORKS," filed Jun. 3, 2017, each of which is hereby incorporated herein by reference in its entirety and made part of the present U.S. Utility Patent Application for all purposes.

TECHNICAL FIELD

The present description generally relates to task allocation, including dynamic task allocation for neural networks.

BACKGROUND

Software engineers and scientists have been using computer hardware for machine learning to make improvements across different industry applications including image classification, video analytics, speech recognition and natural language processing, etc. Notably, deep learning neural networks are being utilized more frequently to create systems that can perform different computing tasks from sizable amounts of data.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Machine learning has existed for many years but has seen a meteoric rise in popularity in recent years due to the availability of massive amounts of training data, and advances in more powerful and efficient computing hardware. A common approach is utilizing a graphical processing unit (GPU) for training a deep neural network, and also for executing the deep neural network on new input data post-training. However, when deploying a given deep neural network for execution on a target platform, depending on the available hardware, it may be more efficient to run certain operations either on a GPU (if available) or in some instances run the operations instead on a CPU (if available) on a node by node basis. Existing solutions for executing a deep neural network on a given platform lack capabilities for making these kinds of determinations prior to execution, and further lack the capabilities, during runtime, to dynamically allocate performing an operation on a CPU or GPU based on available resources at runtime and/or other factors.

Implementations of the subject technology minimize a total runtime associated with a neural network model across any number of different device types by: for each layer of the neural network model, applying annotations at each node of the layer to enable a dynamic allocation of performing the node's operations on either a CPU or a GPU (e.g., at runtime). The annotations provide an indication as to whether a GPU or a CPU may be best suited to perform the node's operations based on, for example, the types of operations being performed. A device executing the neural network model may use the annotation to determine whether to utilize the GPU or CPU for each node of each layer (e.g., based at least on the device's hardware capabilities and/or current resource utilization). Annotating the nodes of the neural network model in this manner enables an annotated neural network model to be compiled once and used efficiently across any number of different types of devices, including future devices with different hardware capabilities.

Figure 1:
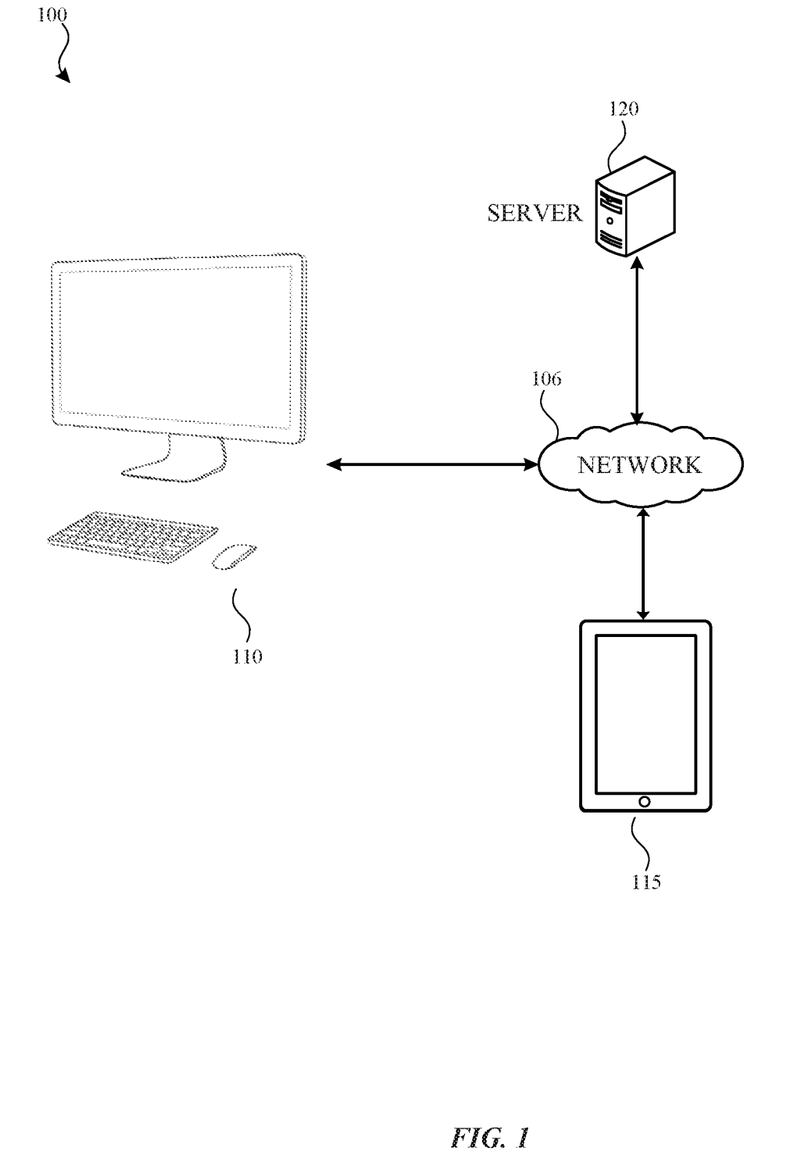
FIG. 1 illustrates an example network environment for performing dynamic task allocation for neural networks in accordance with one or more implementations.

FIG. 1 illustrates an example network environment 100 for performing dynamic task allocation for neural networks in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, and a server 120. The network 106 may communicatively (directly or indirectly) couple the electronic device 110 and/or the server 120, the electronic device 115 and/or the server 120, and/or electronic device 110 and/or the electronic device 115. In one or more implementations, the network 106 may be an interconnected network of devices that may include, or may be communicatively coupled to, the Internet. For explanatory purposes, the network environment 100 is illustrated in FIG. 1 as including an electronic device 110, an electronic device 115, and a server 120; however, the network environment 100 may include any number of electronic devices and any number of servers.

The electronic device 110 may be, for example, desktop computer, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 110 is depicted as a desktop computer. The electronic device 110 may be, and/or may include all or part of, the electronic system discussed below with respect to FIG. 6.

In one or more implementations, the electronic device 110 may provide a system for dynamically allocating tasks performed by neural network models as described herein. In particular, the subject system may include a neural network annotator component, which works in conjunction with a neural network compiler, such that, during compiling a neural network model, the nodes of the neural network model are annotated to indicate a particular processor (e.g., CPU or GPU) for completing an operation associated with a given node in the least amount of total runtime. In an example, the subject system, using the compiled code, can create a software package for deployment on a target device with facilitation from the server 120. When executing the compiled neural network model, the target device can utilize the annotations as an indication to perform a given operation on either a CPU or GPU (e.g., to complete the operation in the least amount of total runtime).

The electronic device 115 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 115 may not include a touchscreen but may support touchscreen-like gestures, such as in a virtual reality or augmented reality environment. In one or more implementations, the electronic device 115 may include a touchpad. In FIG. 1, by way of example, the electronic device 115 is depicted as a tablet device with a touchscreen. In one or more implementations, the electronic device 115 may be, and/or may include all or part of, the electronic device discussed below with respect to the electronic system discussed below with respect to FIG. 6.

In one or more implementations, the server 120 deploys the compiled code included in a software package to a target device for execution. The electronic device 115, in an example, may be a target device for receiving the software package with the compiled neural network code and executing the compiled code in a runtime environment of the electronic device 115. The electronic device 115 (or any electronic device that is a target device) includes a framework that is enabled to access annotations included in the compiled code of the neural network and subsequently make decisions for each operation (e.g., either running it on a CPU, GPU, specialized processor, etc.) based on the accessed annotations. A framework can refer to a software environment that provides particular functionality as part of a larger software platform to facilitate development of software applications.

Figure 2:
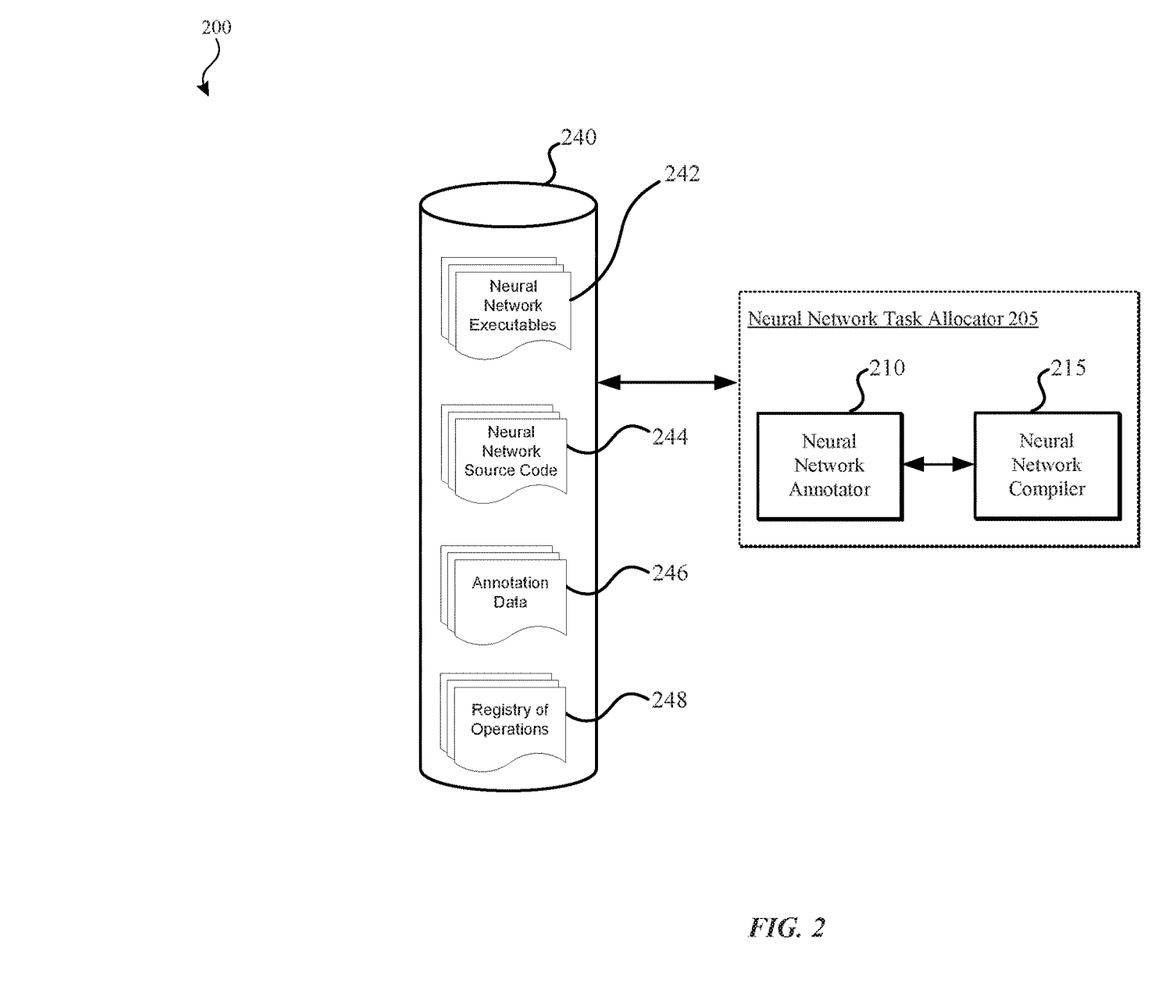
FIG. 2 illustrates an example software architecture for performing dynamic task allocation for neural networks in accordance with one or more implementations.

FIG. 2 illustrates an example software architecture 200 for optimizing neural networks in accordance with one or more implementations. For explanatory purposes, the software architecture 200 is described as being provided by the electronic device 110 of FIG. 1, such as by a processor and/or memory of the electronic device 110; however, the software architecture 200 may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the software architecture 200 includes a neural network task allocator 205 that includes a neural network annotator 210 and a neural network compiler 215. A storage 240 includes neural network source code, which after being compiled by the neural network compiler 215, generates neural network executables 242 that can be deployed to different target platforms for execution. Although the neural network annotator 210 is shown as being separate from the neural network compiler 215 for purposes of explanation, in at least one implementation, the neural network annotator 210 may be part of the neural network compiler 215 such that the neural network compiler 215 performs annotations of the neural network source code 244 during compiling in the same manner as the neural network annotator 210 as described below.

During compile time, the neural network annotator 210, for each node at a layer of a neural network model, can determine an operation performed at the node and annotate that node to perform on either a CPU or GPU (or some other processor or hardware) of a given electronic device that is a target platform for executing the neural network model. In an example, the neural network annotator 210 can initially determine whether a given operation is supported by only the CPU, or only the GPU and annotate a particular node accordingly. The neural network annotator 210 can also consider a total runtime of completing an operation (e.g., for a case in which the operation can be run on either the CPU or GPU) for determining the annotation for a particular node. To determine the total runtime of an operation, the neural network annotator 210 determines a sum based on a cost of transferring the operation to another processor (if any) and a cost for completing the operation on the particular processor. In particular, a cost of transferring the operation (e.g., in terms of latency or time) from a CPU to instead run on a GPU or vice-versa is determined. A cost of the operation on the CPU and/or the GPU is also determined based on a number of cycles for completing the operation, where a more costly operation would take more cycles to complete in comparison to a less costly operation. The neural network annotator 210 then determines the total runtime by adding the cost of transferring the operation and the number of cycles for completing the operation.

In an example, the neural network annotator 210 can compare respective total runtime values for completing the operation on the CPU or GPU and then annotate the node based on whichever has the lower total runtime value. In another example, if the cost to transfer the operation to the GPU in addition with running the operation on the GPU results in the total runtime being greater than keeping the operation on the CPU, then neural network annotator 210 does not annotate the node to complete the operation on the GPU. In one or more implementations, the neural network annotator 210 determines the annotation without factoring in the cost to transfer the operation to another processor.

Further, the neural network annotator 210 can determine whether a given operation optimized for the CPU or the GPU. In this example, the neural network annotator 210 would look at the architecture of the target device to determine whether the device would run the operation better on either the CPU or GPU. The neural network annotator 210 can also determine an estimated computing cost of executing the operation on the CPU and/or the GPU. For example, in instances in which the operation is supported by the CPU and the GPU, the neural network annotator 210 can determine which processor completes the operation in a faster amount of time (e.g., by looking at the architecture of the device to determine whether the device would run the operation better on either the CPU or GPU).

The storage 240 further includes a registry of operations 248 that includes information of each supported operation that can run on a given platform and/or every processor (e.g., CPU, GPU, or specialized or custom processor e.g., AI optimized processor). In an example, annotation of each node in a neural network model is assigned in part by using the registry of operations 248 and determining whether a given operation is supported by a particular CPU or GPU for the given platform. For example, the neural network annotator 210 accesses the registry of operations 248 and determines if an operation of a node is not supported by the CPU but supported by the GPU (or vice-versa) based on information provided in the registry of operations 248. The neural network annotator 210 can annotate that node accordingly to indicate the supported hardware (e.g., CPU or GPU) to execute the operation.

In one or more implementations, the registry of operations 248 may be implemented as one or more lookup tables including: 1) lookup table(s) for required type and parameters for each supported operation per device; and 2) lookup table(s) for performance measurements of an operation per device or hardware processor. In an example, a lookup table is data structure that enables quick access to values that replace runtime computation that might be needed to determine such values (e.g., performance measurements and required type and parameters mentioned above). The neural network annotator 210 in an example can utilize a lookup table to determine whether the CPU or GPU would have better performance in running a particular operation. In addition to performance measurements, the neural network annotator 210 can further check a type and/or parameter(s) that are required for a given operation. If there is a type mismatch or missing parameters that would disallow a particular operation to complete on a CPU or GPU, the neural network annotator 210 can annotate a particular node accordingly to use the other processor.

The neural network compiler 215 takes neural network source code 244 and compiles it into a neural network executable 242. As mentioned above, during the compiling process, the neural network annotator 210 assigns an annotation of each node to indicate whether the operation is best performed on a CPU or GPU based at least in part on hardware capabilities of a target device and the considerations discussed elsewhere herein. In an example, the neural network source code 244 can represent in code form a set of operations that are to be performed by corresponding nodes of a given neural network model. The neural network annotator 210 therefore may annotate, within the neural network source code 244, an indication to perform a particular operation of a node on particular hardware, such as a CPU or a GPU, or specialized processor. In turn, the neural network compiler 215 compiles the neural network source code 244 with the annotations. Consequently, the annotations are included as part of the compiled neural network model code in one implementation. In at least one implementation, the neural network annotator 210 may also store associated annotation data 246 separately in the storage 240.

Figure 3A:
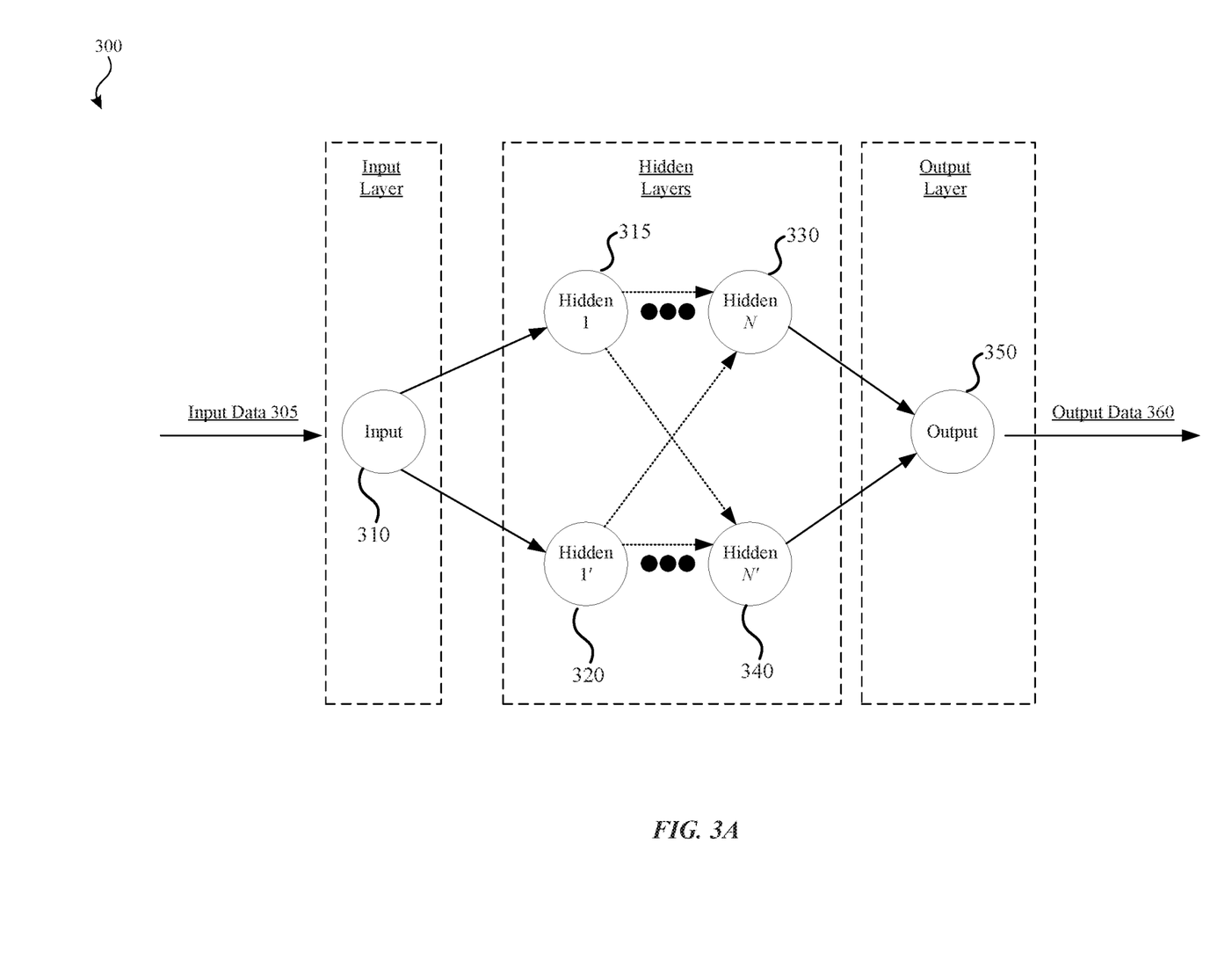
FIGS. 3A-3C illustrate example neutral network models in different examples of annotation in accordance with one or more implementations.
Figure 3B:
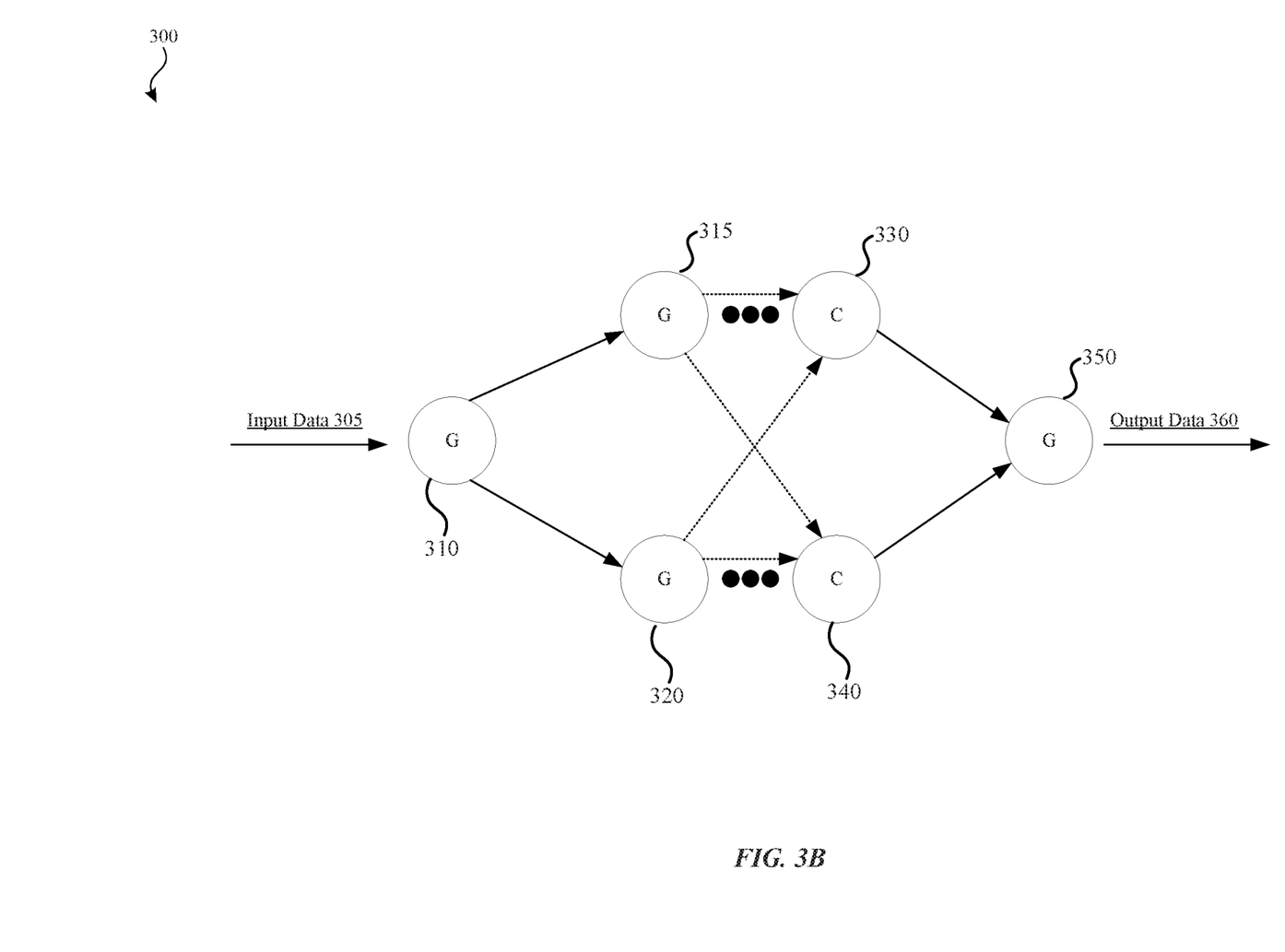
Figure 3C:
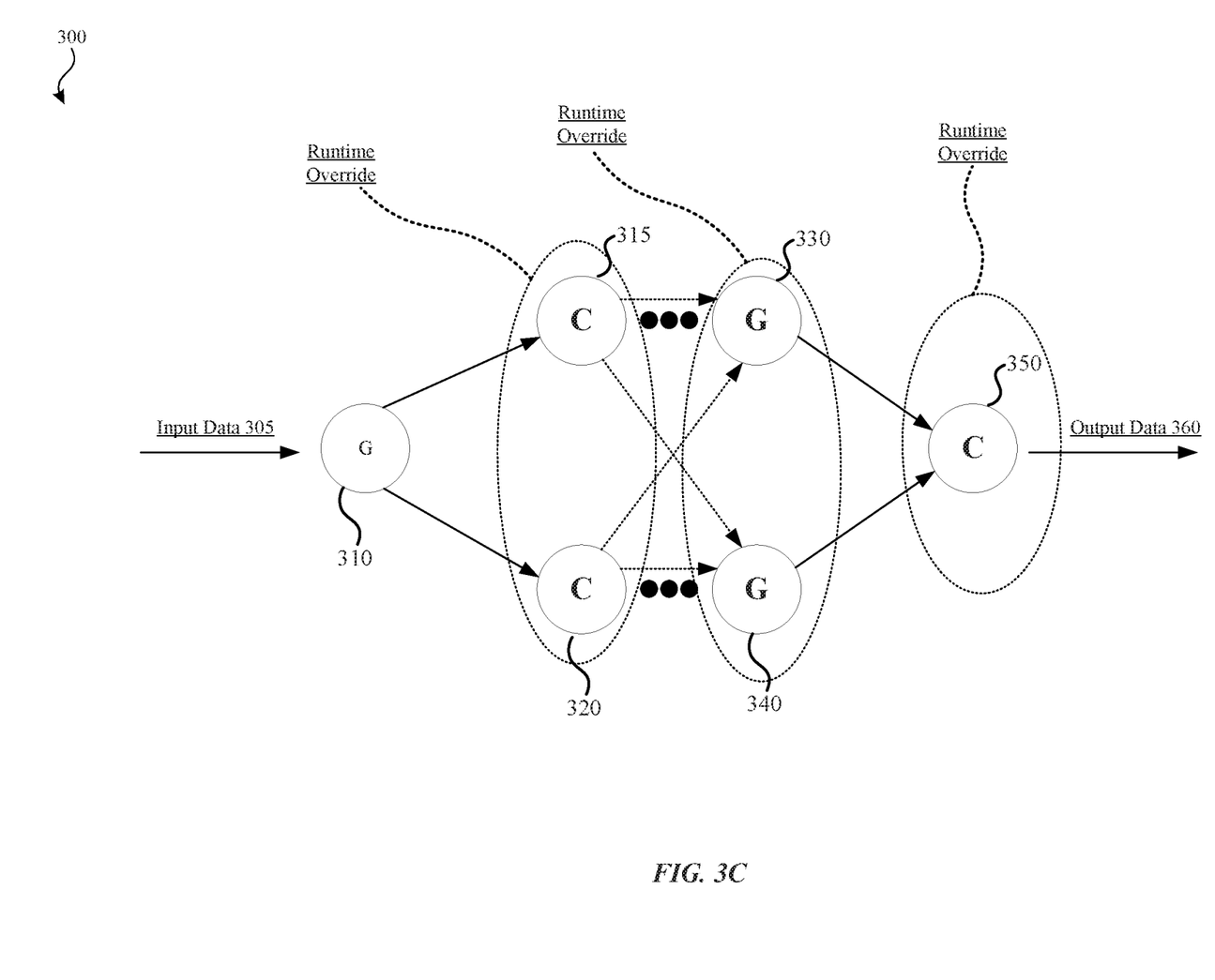

FIGS. 3A-3C illustrate example neutral network models in different examples of annotation in accordance with one or more implementations. FIGS. 3A-3C will be discussed by references to the software architecture 200 in FIG. 2, particularly with respect to components of the neural network task allocator 205. For purposes of explanation of FIGS. 3A-3C, a neural network model can refer to a feedforward deep neural network that is implemented to approximate a function $f$. Models in this regard are referred to as feedforward because information flows through the function being evaluated from an input x, through one or more intermediate operations used to define $f$, and finally to an output y. Feedforward deep neural networks are called networks because they may be represented by connecting together different operations. A model of the feedforward deep neural networks may be represented as a graph representing how the operations are connected together from an input layer, through one or more hidden layers, and finally to an output layer. Each node in such a graph represents an operation to be performed in an example. It is appreciated, however, that other types of neural networks are contemplated by the implementations described herein. For example, a recurrent neural network such as a long short-term memory (LSTM) neural network may be provided for annotation, or a convolutional neural network (CNN) may be provided for annotation.

As illustrated in FIG. 3A, an example neural network model 300 includes an input layer with an input layer node 310, a number of hidden layers including hidden layer nodes 315 and 320 in a first hidden lawyer, and hidden layer nodes 330 and 340 in a second hidden layer, and an output layer with an output layer node 350. In this example, each node in the neural network model 300 corresponds to an operation performed by the neural network model 300 based on received input data. Initially, input data 305 is received by the input layer node 310. The input node may perform an operation on the received input data 305 and then send the output to hidden layer nodes 315 and 320 for further processing. Similarly, each of the hidden layer nodes 315 and 320 may perform an operation on the received data and then forward the respective output to hidden layer nodes 330 and 340. The hidden layer nodes 330 and 340, likewise, will perform an operation on the received data and forward the respective output to the output layer node 350. The output layer node 350 may perform an operation and then provide the result as output data 360. Data is propagated through the neural network model 300 in this manner.

Although, for purposes of explanation, the example neural network model 300 includes a single node in the input layer, and a single node in the output layer, it is understood that any number of nodes may be included in the input and/or output layer. Further, any number of nodes may be included in a particular hidden layer along with any number of hidden layers may be included in the neural network model 300.

The neural network annotator 210 may annotate each node in the neural network model 300. As illustrated in FIG. 3B, the nodes of the neural network model 300 are assigned with an annotation "G" for GPU or "C" for CPU. It is appreciated, however, that any other type of annotation may be utilized, including additional annotations for additional processors. Additionally, an annotation may include additional information (e.g., metadata describing the reasons behind annotating a particular node for running on either the GPU or CPU).

In one or more implementations, the neural network annotator 210 may annotate each node starting from the output layer and traverse toward the input layer, going one node at a time in this manner. In order to annotate the nodes, the neural network annotator 210 takes in consideration the hardware and architecture of a target device (e.g., the electronic device 115) for executing a compiled version of the neural network model 300. Annotation can be based part by using registry of operations and determining whether operation is supported by particular CPU or GPU for the given platform as described in FIG. 2. More specifically, in order to determine the annotation, the neural network annotator 210 determines whether the operation is supported on either the CPU or GPU, determines whether the operation is more optimized for running on the CPU or GPU, determines an estimated cost for transferring (e.g., a copy operation) this operation from the CPU to the GPU, or from the GPU to the CPU, and/or determines an estimated computing cost of executing the operation on the CPU and/or the GPU.

As shown, the neural network annotator 210 has annotated the output layer node 350 with a "G" to indicate that the operation is to be performed on a GPU of the target device. The neural network annotator 210 can then annotate each node of the hidden layer that includes hidden layer nodes 330 and 340. In this example, the neural network annotator 210 has, based on separate determinations, annotated these nodes with "C" to indicate their respective operations are to be performed on a CPU of the target device. The neural network annotator 210 then moves to the next hidden layer toward the input layer and annotates the nodes therein. In this example, the neural network annotator 210 has, based on separate determinations, annotated the hidden layer nodes 315 and 320 with "G" to indicate their respective operations are to be performed on the GPU of the target device. Finally, the neural network annotator 210 annotates the input layer node 310 with "G" to indicate its respective operation is to be performed on the GPU of the target device.

It is appreciated that, for purposes of explanation, the hidden layer nodes 315 and 320 have the same type of annotation, and the hidden layer nodes 330 and 340 have the same type of annotation, each of these hidden layer nodes could have different types of annotations.

The neural network compiler 215 compiles the source code corresponding to the neural network model 300 with the above-described annotations. In this manner, the annotations are included as part of the compiled neural network model code.

Although each node of the neural network model 300 has been annotated, in one or more implementations, a target device, while executing the neural network model 300, may override the annotation on a particular node during runtime to indicate to perform the operation on different hardware. FIG. 3C illustrates the neural network model 300 in which different nodes have had their original annotation from FIG. 3B overridden during runtime. FIG. 3C will be discussed by reference to the electronic device 115 that is the target device running the compiled executable version of the neural network model 300.

In one or more implementations, the electronic device 115 may include a framework that is able to access the annotations that are provided for each operation in the nodes of the neural network model 300. A framework on the electronic device 115 loads the compiled annotated neural network model 300 and accesses each node of the annotated neural network model 300. The framework of the electronic device 115 refers to a system interface that provides a software architecture and abstraction layer to facilitate communication with underlying hardware of a device. The framework may include a dynamic shared library and the resources (such as header files, images, and helper apps) needed to support that library.

During runtime, the framework of the electronic device 115 starts at the output layer of the neural network model 300 and traverses backward to the input layer, analyzing the annotation at each node and determining whether to preserve the annotation or override the annotation based at least on the current utilization of CPU or GPU and/or registry of operations.

In FIG. 3C, starting at the output layer of the neural network model 300, the framework of the electronic device 115 determines that the output layer node 350 includes an annotation of "G" indicating that the operation is to be performed on the GPU of the electronic device 115. During runtime, based on current computing resources of the electronic device 115, the framework of the electronic device 115 determines that the operation in the output layer node 350 should be run using the CPU instead and therefore overrides the annotation. In an example, overriding the annotation may include replacing the existing annotation with a different annotation, or creating a temporary copy of a set of annotations corresponding to the new annotation(s). The framework of electronic device 115 continues to the next layer and determines, based on separate determinations, that the hidden layer nodes 330 and 340 should instead be run using the GPU instead and overrides the previous annotations. The framework of electronic device 115 continues to the next layer and determines, based on separate determinations, that the hidden layer nodes 315 and 320 should instead be run using the CPU and overrides the respective annotations. The framework of electronic device 115 accesses the input layer node 310 and determines that the annotation indicates to run the operation on the GPU and determines that the annotation will be adhered to and does not override the annotation.

It is appreciated that, for purposes of explaining the example in FIG. 3C, the hidden layer nodes 315 and 320 have the same type of annotation, and the hidden layer nodes 330 and 340 have the same type of annotation, each of these hidden layer nodes could have different types of annotations.

Overriding respective annotations as discussed above may be determined using different approaches. A registry of operations may be used to determine whether the current hardware of the electronic device supports the operation at a given node. For example, the annotation may call for running the operation on the CPU, but new GPU in the current hardware may support the operation and run it less expensively than the CPU (e.g., another lookup table can be utilized to compare estimated performance numbers in this example). Thus, if the node is annotated to run on the CPU, that node may instead be indicated to run on the new GPU instead.

When the annotation calls for a transfer to the other processor, the framework of the electronic device 115 determines the cost of transferring from the CPU to the GPU or vice versa, and if the total cost based on the transfer and running it on the other processor is greater than keeping the operation on the current processor, the framework of the electronic device 115 can override the annotation of the node.

The framework of the electronic device 115 can also determine the utilization of the CPU and the GPU at runtime to determine whether to follow the annotation. The framework of the electronic device 115 also considers quality of service (QoS) with respect to rest of device so that if the annotation calls for a transfer to the other processor, the annotation may be overridden if utilization of the other processor is high or above a predefined utilization threshold.

Further, the framework of the electronic device 115 can also determine a priority of an application that will be running the neural network model. For example, a photos application that is launched by a user can take priority over other background applications (e.g., daemons) such that these background application would lose resources if the photos application is requesting the same resources (e.g., CPU or GPU). In an example, if the background applications are currently utilizing more of the CPU, and the photos application has a higher priority than those applications, the annotation can be overridden from a GPU to a CPU designation such that the photos application would be ensured to utilize more resources from the CPU than the background applications.

Additionally, the framework of the electronic device 115 can determine the priority of each processor (e.g., GPU may be higher priority than CPU and/or another processor) and determine to override the annotation if the other processor has the higher priority.

Moreover, the framework of the electronic device 115 can look at the current power usage and remaining battery level of device, and determine to override the annotation based on whether power usage or remaining battery level would be severely impacted by running the operation on a particular processor.

The framework of the electronic device 115 may further utilize predictive information (e.g., from a service running on the electronic device 115 that provides historical usage information of applications based on prior user activity) to predicts battery life, when idle, availability, power capacity, etc., in order to determine whether to override the annotation if system performance would be severely impacted based on the predicted behavior of the usage of applications.

The above examples may be utilized in conjunction with each other to determine whether to override a given annotation. Although several examples are discussed above, it is appreciated that other information and heuristics may be considered in determining whether to override a given annotation at a node.

Figure 4:
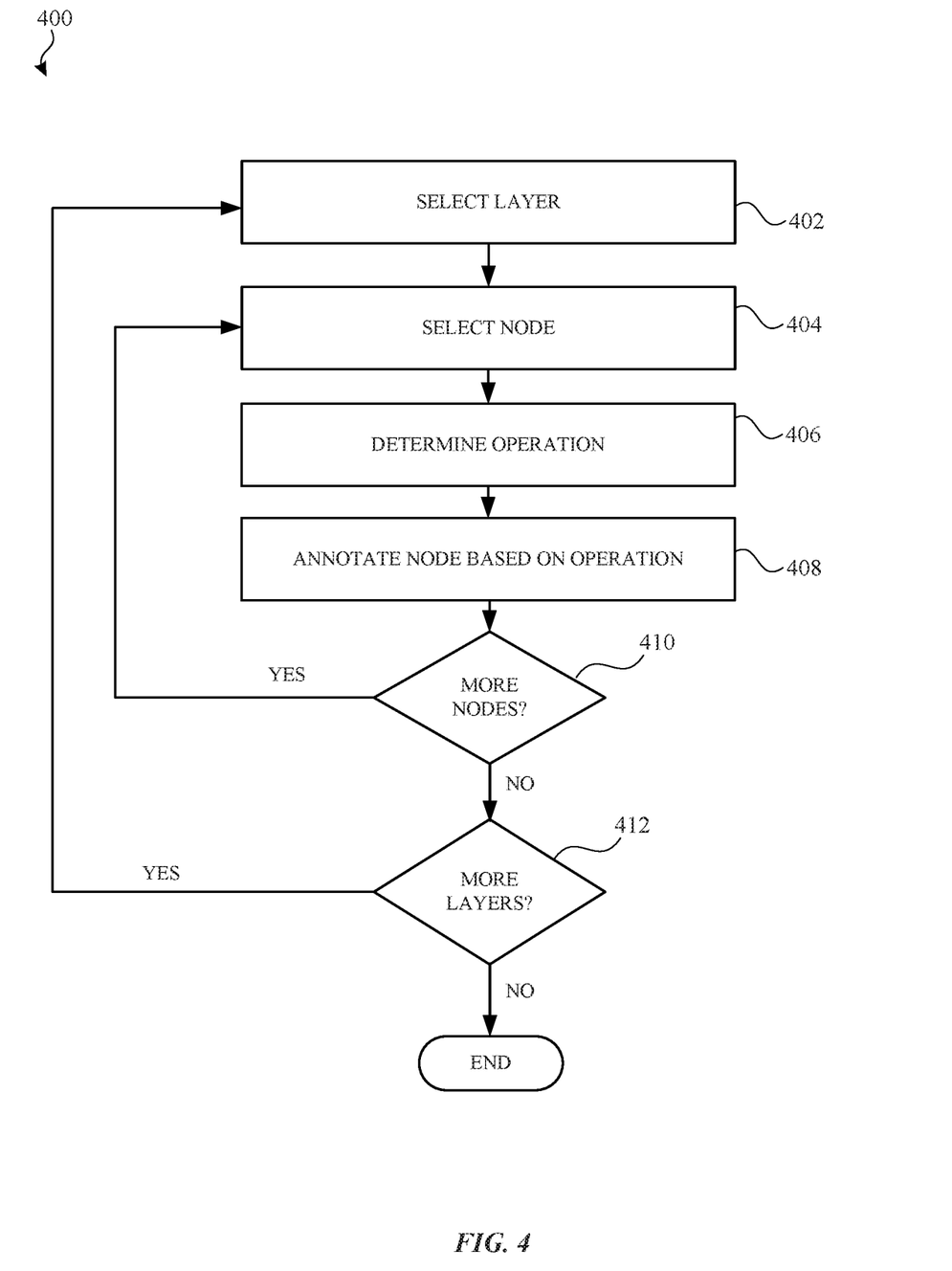
FIG. 4 illustrates a flow diagram of an example process for annotating a neural network model in accordance with one or more implementations.

FIG. 4 illustrates a flow diagram of an example process 400 for annotating a neural network model in accordance with one or more implementations. For explanatory purposes, the process 400 is primarily described herein with reference to components of the software architecture of FIG. 2, which may be executed by one or more processors of the electronic device 110 of FIG. 1. However, the process 400 is not limited to the electronic device 115, and one or more blocks (or operations) of the process 400 may be performed by one or more other components of other suitable devices. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The neural network annotator 210 selects a layer (402) of a neural network model. In an example, the initial layer that is selected is the output layer of the neural network model. The neural network annotator 210 selects a node of the layer (404) of the neural network model.

The neural network annotator 210 determines an operation corresponding to the node of the layer (406) of the neural network model. The neural network annotator 210 annotates the node of the layer (408) of the neural network model. Annotation can be performed by using a registry of operations and determining whether an operation is supported by particular CPU or GPU for the given platform as described in FIG. 2. In particular, for determining the annotation, the neural network annotator 210 determines whether the operation is supported on either the CPU or GPU, determines whether the operation is more optimized for running on the CPU or GPU, determines an estimated cost for transferring (e.g., a copy operation) this operation from the CPU to the GPU, or from the GPU to the CPU (depending on the annotation of the previously annotated node), and/or determines an estimated computing cost of executing the operation on the CPU and/or the GPU.

The neural network annotator 210 determines whether there are more nodes in the layer (410) of the neural network model. If so, the neural network annotator 210 selects another node (404) and repeats the subsequent operations. If there are no more nodes in the layer, the neural network annotator 210 determines whether there are any more layers in the neural network model. If there are more layers (412), the neural network annotator 210 selects another layer (402) and repeats the subsequent operations. Alternatively, if there are no more layers (412), the process 400 may complete.

Figure 5:
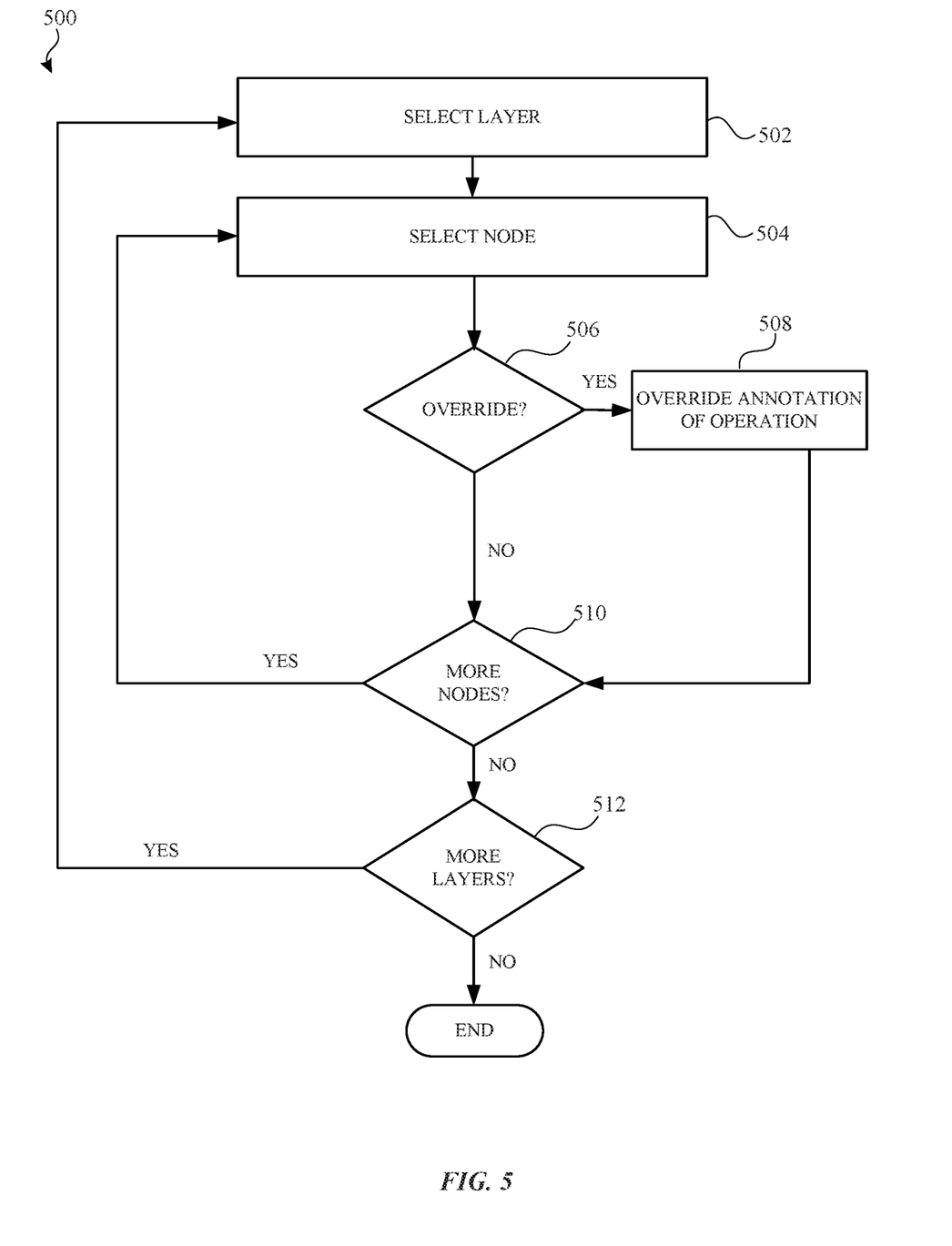
FIG. 5 illustrates an example process for executing a neural network model and determining whether to override a particular annotation of a node in accordance with one or more implementations.

FIG. 5 illustrates an example process 500 for executing a neural network model and determining whether to override a particular annotation of a node in accordance with one or more implementations. For explanatory purposes, the process 500 is primarily described herein with reference to components of the software architecture of FIG. 2, which may be executed by one or more processors of the electronic device 115 of FIG. 1. However, the process 500 is not limited to the electronic device 115, and one or more blocks (or operations) of the process 500 may be performed by one or more other components of other suitable devices. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The framework of the electronic device 115 selects a layer (502) of a neural network model associated with a compiled and annotated neural network model. In an example, the initial layer that is selected is the output layer of the neural network model. The framework of the electronic device 115 selects a node of the layer (504) of the neural network model.

The framework of the electronic device 115 determines whether to override an operation corresponding to the node of the layer (506) of the neural network model. The framework of the electronic device 115 overrides (508) the annotation of the node of the layer of the neural network model. Different approaches for overriding respective annotations were discussed above by reference to FIG. 3C. Alternatively, the framework of the electronic device 115 determines not to override the annotation (506).

The framework of the electronic device 115 determines whether there are more nodes in the layer (510) of the neural network model. If so, the framework of the electronic device 115 selects another node (504) and repeats the subsequent operations. If there are no more nodes in the layer, the framework of the electronic device 115 determines whether there are any more layers in the neural network model. If there are more layers (512), the framework of the electronic device 115 selects another layer (502) and repeats the subsequent operations. Alternatively, if there are no more layers (512), the process 500 may complete.

Figure 6:
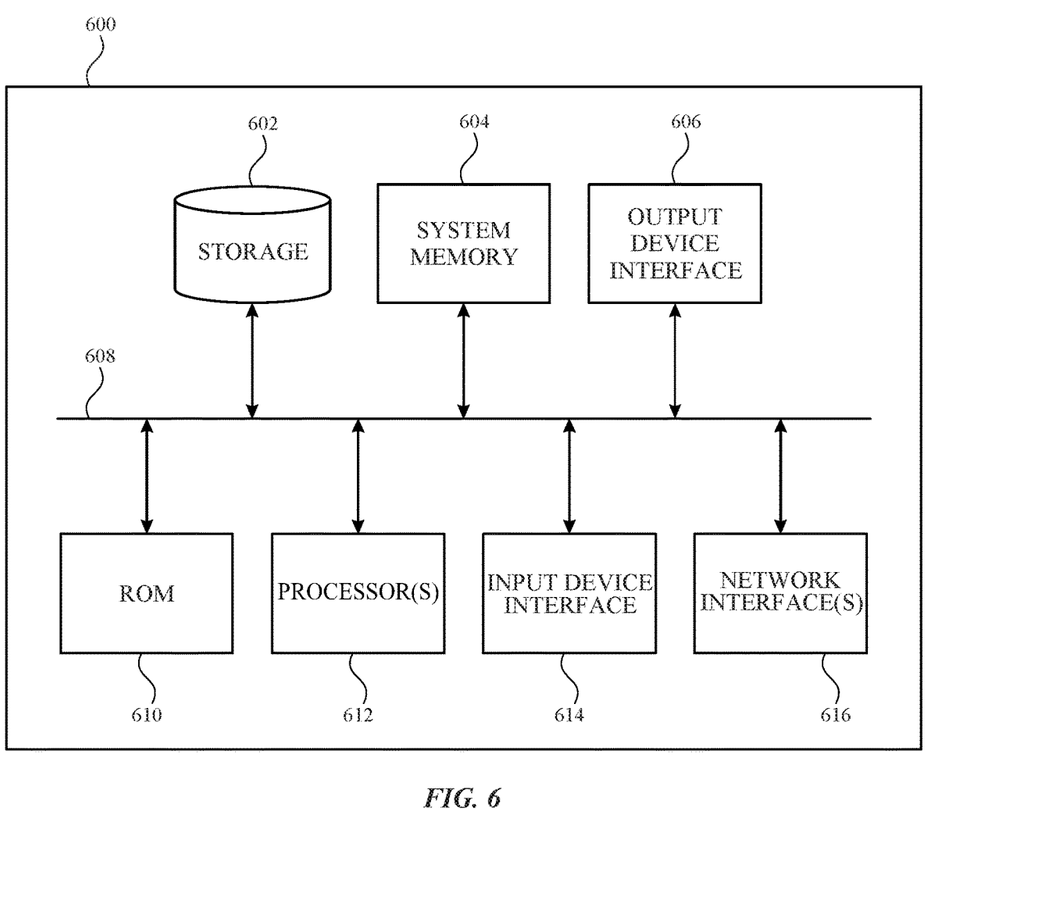
FIG. 6 illustrates an electronic system with which one or more implementations of the subject technology may be implemented.

FIG. 6 illustrates an electronic system 600 with which one or more implementations of the subject technology may be implemented. The electronic system 600 can be, and/or can be a part of, the electronic device 110, the electronic device 115, and/or the server 120 shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes, such as the electronic device 115 shown in FIG. 1, through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system comprising;
   a processor;
   a graphics processing unit; and
   a memory device containing instructions, which when executed by the processor cause the processor to:

at runtime, for each node of a first layer of a neural network model:
  determine an operation performed at the node;
  determine whether to override an annotation of the operation performed at the node, the annotation indicating whether the operation should be performed on the processor or the graphics processing unit, and the annotation having been assigned based at least in part on a cost of transferring the operation between the processor and the graphics processing unit;
  determine whether the neural network model includes a second layer, the second layer being different than the first layer; and
  in response to determining that the neural network model includes the second layer, for each node of the second layer of the neural network model:
    determine a second operation performed at the node of the second layer; and
    determine whether to override an annotation of the second operation performed at the node of the second layer.

2. The system of claim 1, wherein to determine whether to override the annotation of the operation performed at the node further comprises:
  determining whether the processor or the graphics processing unit supports the operation.

3. The system of claim 2, wherein determining whether the processor or the graphics processing unit supports the operation is based on a registry of operations.

4. The system of claim 1, wherein to determine whether to override the annotation of the operation performed at the node is based on a cost of transferring the operation from the processor to the graphics processing unit.

5. The system of claim 1, wherein to determine whether to override the annotation of the operation performed at the node is based on a current utilization of the processor and the graphics processing unit.

6. The system of claim 1, wherein to determine whether to override the annotation of the operation performed at the node is based on a priority of an application that is running the neural network model.

7. The system of claim 1, wherein to determine whether to override the annotation of the operation performed at the node is based on a priority of the processor and a priority of the graphics processing unit.

8. The system of claim 1, wherein to determine whether to override the annotation of the operation performed at the node is based on a current power usage or remaining battery level of the system.

9. The system of claim 1, wherein the first layer comprises an output layer.

10. A method comprising:
at runtime, for each node of a first layer of a neural network model:
  determining an operation performed at the node;
  determining whether to override an annotation of the operation performed at the node, the annotation indicating whether the operation should be performed on a processor or a graphics processing unit, and the annotation having been assigned based at least in part on a cost of transferring the operation between a processor and a graphics processing unit;
  determining whether the neural network model includes a second layer, the second layer being different than the first layer; and
  in response to determining that the neural network model includes the second layer, for each node of the second layer of the neural network model:
    determining a second operation performed at the node; and
    determining whether to override an annotation of the second operation performed at the node.

11. The method of claim 10, wherein determining whether to override the annotation of the operation performed at the node further comprises:
  determining whether the processor or the graphics processing unit supports the operation.

12. The method of claim 11, wherein determining whether the processor or the graphics processing unit supports the operation is based on a registry of operations.

13. The method of claim 10, wherein determining whether to override the annotation of the operation performed at the node is based on a cost of transferring the operation from the processor to the graphics processing unit.

14. The method of claim 10, wherein determining whether to override the annotation of the operation performed at the node is based on a current utilization of the processor and the graphics processing unit.

15. The method of claim 10, wherein determining whether to override the annotation of the operation performed at the node is based on a priority of an application that is running the neural network model.

16. The method of claim 10, wherein determining whether to override the annotation of the operation performed at the node is based on a priority of the processor and a priority of the graphics processing unit.

17. The method of claim 10, wherein the first layer comprises an output layer.

18. A non-transitory computer-readable medium comprising instructions, which when executed by a computing device, cause the computing device to perform operations comprising:
at runtime, for each node of a first layer of a neural network model:
  determining an operation performed at the node;
  determining whether to override an annotation of the operation performed at the node, the annotation indicating whether the operation should be performed on a processor or a graphics processing unit, and the annotation having been assigned based at least in part on a cost of transferring the operation between a processor and a graphics processing unit;
  determining whether the neural network model includes a second layer, the second layer being different than the first layer; and
  in response to determining that the neural network model includes the second layer, for each node of the second layer of the neural network model:
    determining a second operation performed at the node of the second layer; and
    determining whether to override an annotation of the second operation performed at the node of the second layer.

19. The non-transitory computer-readable medium of claim 18, wherein the first layer comprises an output layer.

20. The non-transitory computer-readable medium of claim 18, wherein determining whether to override the annotation of the operation performed at the node is based on a priority of the processor and a priority of the graphics processing unit.

* * * * *